United States Patent
Landwehr et al.

(12)

(10) Patent No.: US 11,101,836 B2
(45) Date of Patent: Aug. 24, 2021

(54) PORTABLE COMPUTING DEVICE COVER WITH FULLY ENCAPSULATED STIFFENERS

(71) Applicant: NVIDIA Corporation, Santa Clara, CA (US)

(72) Inventors: Boris Landwehr, Thousand Oaks, CA (US); Hyoji Heidi Lim, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/156,304

(22) Filed: May 16, 2016

(65) Prior Publication Data

US 2017/0331506 A1 Nov. 16, 2017

(51) Int. Cl.
*H04B 1/3888* (2015.01)
*A45C 11/00* (2006.01)

(52) U.S. Cl.
CPC ............ *H04B 1/3888* (2013.01); *A45C 11/00* (2013.01); *A45C 2011/003* (2013.01)

(58) Field of Classification Search
CPC .............. A45C 11/00; A45C 2011/002; A45C 2011/003; A45C 13/1069; A45C 15/00; A45C 2013/025
USPC ..... 455/575.8, 575.1, 550.1, 347, 90.1–90.3, 455/422.1, 403, 575.3; 379/433.01, 379/433.11, 437, 440, 451
See application file for complete search history.

(56) References Cited

U.S. PATENT DOCUMENTS

| | | | |
|---|---|---|---|
| 2012/0177239 A1* | 7/2012 | Lee ................. | H04R 1/086 381/359 |
| 2013/0213856 A1* | 8/2013 | Ho ................... | A45C 11/00 206/775 |
| 2013/0214661 A1* | 8/2013 | McBroom ......... | G06F 1/1667 312/325 |
| 2014/0262933 A1* | 9/2014 | Lockwood ........ | A45C 11/00 206/762 |
| 2015/0295615 A1* | 10/2015 | Smith ............... | A45C 5/02 455/575.8 |
| 2015/0365124 A1* | 12/2015 | Choi ................. | H04B 1/3888 455/575.8 |
| 2016/0249472 A1* | 8/2016 | Tu .................... | H05K 5/0234 |

* cited by examiner

*Primary Examiner* — Keith Ferguson
(74) *Attorney, Agent, or Firm* — Artegis Law Group, LLP

(57) ABSTRACT

A cover for a portable computing device includes a cover panel having a first portion of a solid silicone rubber sheet and a first stiffener panel that is fully encapsulated in the first portion of the solid silicone rubber sheet.

26 Claims, 4 Drawing Sheets

PORTABLE COMPUTING DEVICE COVER WITH FULLY ENCAPSULATED STIFFENERS

BACKGROUND OF THE INVENTION

Field of the Invention

The present invention relates generally to portable computing devices and, more specifically, to a portable computing device cover with fully encapsulated stiffeners.

Description of the Related Art

Tablet computers, smartphones, and other portable computing devices have become increasingly common in many aspects of daily life, both for work applications and personal use. Accordingly, tablet and phone covers have also become very popular, to prevent scratching of device touchscreens as well as soiling, wear, and other damage that may occur to such devices from shocks and repeated use. In addition, covers for portable computing devices can introduce personalized ornamentation for these types of devices and provide a means for better positioning the devices for viewing and/or typing. Unfortunately, the useful life of conventional covers can be limited because the stiffening panels included in many device covers are typically laminated in place between sheets of polyurethane, microfiber, and the like. Consequently, the folding portions of the cover, which are situated between the stiffener panels, generally begin wrinkling and/or delaminating after only light use.

Solid silicone rubber (SSR) and liquid silicon rubber (LSR) materials have many properties that are well-suited for use in portable device covers. Specifically, SSR materials are non-reactive, flexible, tear- and stain-resistant, and can absorb impacts. However, the robust attachment of stiffener panels to an SSR material is highly problematic, because SSR materials cannot be strongly bonded to other materials. Therefore, SSR materials cannot be easily incorporated into a laminated assembly, given that one or more material layers must be somehow bonded to the SSR material to create such an assembly. As a result, portable device covers that include an SSR material and a stiffener panel are not commonly used.

One solution sometimes employed when attempting to use SSR materials for portable device covers is to partially embed a stiffener panel within an SSR material layer when forming a device cover, so that the SSR material is does not require lamination with another material layer. Unfortunately, during the process of curing the SSR material, accurate positioning of the stiffener panel within the SSR material typically requires contact with positioning fixtures or holding pins of some sort. Consequently, perforations are necessarily (partial exposure of stiffener panels) formed through the SSR material to partially expose the stiffener panels, and are unaesthetically pleasing to consumers and difficult to clean.

As the foregoing illustrates, what would be useful is a portable device cover design that addresses one or more of the above issues.

SUMMARY OF THE INVENTION

One embodiment of the present invention sets forth a cover for a portable computing device that includes a cover panel having a first portion of a solid silicone rubber sheet and a first stiffener panel that is fully encapsulated in the first portion of the solid silicone rubber sheet.

At least one advantage of the disclosed embodiments is that a solid silicone rubber cover for a tablet computer or other portable computing device can include one or more precisely positioned stiffener panels that cannot delaminate from the solid silicone rubber. A further advantage of the disclosed embodiments is that the solid silicone rubber cover can be completely free of holes or penetrations exposing the stiffener panels.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
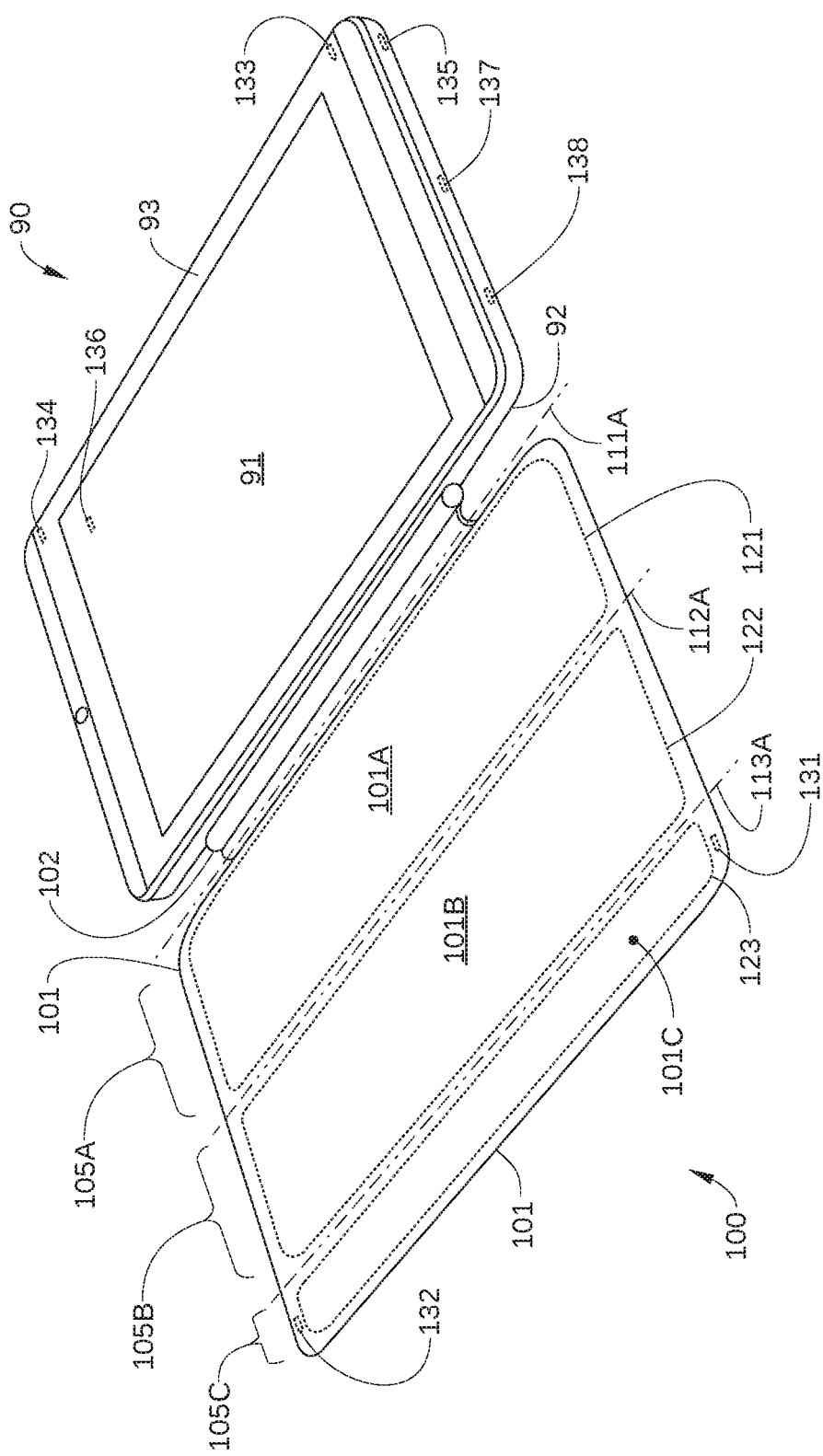
FIG. 1 is a perspective diagram illustrating a portable computing device coupled to a cover, according to various embodiments of the present invention.

FIG. 1 is a perspective diagram illustrating a portable computing device 90 coupled to a cover 100, according to various embodiments of the present invention. FIG. 2A is a plan view of cover 100, according to various embodiments of the present invention, and FIG. 2B is a cross-sectional view of the cover of FIG. 1, according to one or more embodiments of the present invention. In FIGS. 2A and 2B, cover 100 is detached from portable computing device 90. When closed, cover 100 protects a touchscreen 91 of portable computing device 90 from scratches, impacts, and soiling. When opened, cover 100 may, in some embodiments, be deployed as a stand to orient portable computing device 90 at a favorable viewing angle. Cover 100 may include, without limitation, a front cover 101 and an attachment spine 102, both formed from a single solid silicone rubber (SSR) sheet 105.

Portable computing device 90 may be any computing device that includes a touchscreen 91 and is configurable for use with cover 100. For example, portable computing device 90 may be, without limitation, a personal digital assistant (PDA), a smartphone, an electronic tablet, a hand-held video game player, a laptop computer, or a notebook computer.

Front cover 101 generally includes at least one stiffener panel 121 that is fully encapsulated in a portion 105A of SSR sheet 105. Stiffener panel 121 may include any technically feasible structurally rigid member that provides rigidity to front cover 101, such as a metallic plate, or a fiberglass or thermoplastic polymer sheet. Because stiffener panel 121 is fully encapsulated in SSR sheet 105, in some embodiments, no surface of stiffener panel 121 is exposed or visible, thereby providing front cover 101 a simple and aesthetic appearance. In addition, because no surface of stiffener panel 121 is exposed, for example, via holes or windows in SSR sheet 105, front cover 101 may have no exposed surfaces that are not SSR. As noted previously, SSR materials are highly stain- and tear-resistant, colorfast, and easily cleaned. Furthermore, because stiffener panel 121 is fully encapsulated in SSR sheet 105, no lamination process is employed in assembling cover 100. Consequently, wrinkling and delamination of one or more material layers of cover panel 105 does not occur during use, since front cover 101 does not include laminated elements.

Attachment spine 102 is configured to removably attach or anchor cover 100 to portable computing device 90, and may be at least partially formed from SSR sheet 105. In addition, attachment spine 102 is connected to front cover 101 via a flexible hinge region 111 formed from SSR sheet 105. Thus, cover 100 can bend along a fold line 111A. Because flexible hinge region 111 is formed from a single sheet of SSR material, no delamination or wrinkling occurs when cover 100 is repeatedly folded along fold line 111A.

In some embodiments, cover 100 may be coupled to portable computing device 90 with one or more mechanical fasteners. For example and without limitation, in such embodiments, cover 100 may be coupled to edge 92 (shown in FIG. 1) of portable computing device 90 via one or more coupling magnets 107 included in attachment spine 102. For clarity, coupling magnets 107 are omitted from FIG. 1 and are shown in FIG. 2A. Alternatively or additionally, one or more locater tabs 108 that project from edge 92 may mate with a suitably configured slot when cover 100 is coupled to portable computing device 90. In such embodiments, the one or more locater tabs 108 may be configured to secure cover 100 to edge 92. Alternatively, when cover 100 and/or portable computing device 90 includes locater tabs 108, locater tabs 108 may be configured to prevent shear force directed parallel to edge 92 from separating cover 100 from portable computing device 90.

In some embodiments, attachment spine 102 includes a rigid member 106, such as a hardened plastic or metallic plate or rod. In some embodiments, rigid member 106 is fully encapsulated in SSR sheet 105. In other embodiments, portions of rigid member 106 and/or components connected to rigid member 106 may not be fully encapsulated and are partially exposed. For example, in embodiments in which rigid member 106 includes one or more coupling magnets 107 configured to removably connect attachment spine 102 to portable computing device 90, a surface of coupling magnets 107 may be not be covered by SSR sheet 105. In another example, in embodiments in which rigid member 106 includes one or more locater tabs 108, a surface of locater tabs 108 may not be covered by SSR sheet 105. In such embodiments, locater tabs 108 may be configured to connect attachment spine 102 to portable computing device 90, position attachment spine 102 relative to portable computing device 90 so that coupling magnets 107 are correctly aligned with corresponding coupling magnets or magnetic plates in portable computing device 90, and/or prevent shear force directed parallel to edge 92 from separating cover 100 from portable computing device 90. In yet another example, one or more portions of rigid member 106 may be exposed to facilitate mechanical or magnetic coupling with one or more corresponding features on portable computing device 90.

In the embodiment illustrated in FIG. 1, front cover 101 includes multiple hinged panels 101A, 101B, and 101C, and each hinged panel includes a stiffener panel that is fully encapsulated in a different portion of SSR sheet 105. Specifically, hinged panel 101A includes a stiffener panel 121 that is fully encapsulated in portion 105A of SSR sheet 105, hinged panel 101B includes a stiffener panel 122 that is fully encapsulated in a portion 105B of SSR sheet 105, and hinged panel 101C includes a stiffener panel 123 that is fully encapsulated in a portion 105C of SSR sheet 105. As shown, hinged panel 101A is connected to hinged panel 101B via a flexible hinge region 112 formed from SSR sheet 105. Thus, cover 100 can bend along a fold line 112A. Because flexible hinge region 112 is formed from a single sheet of SSR material, no delamination or wrinkling occurs when cover 100 is repeatedly folded along fold line 112A. Similarly, hinged panel 101B is connected to hinged panel 101C via a flexible hinge region 113 formed from SSR sheet 105. Thus, cover 100 can bend along a fold line 113A with no delamination or wrinkling occurring when cover 100 is repeatedly folded along fold line 113A.

Figure 3:
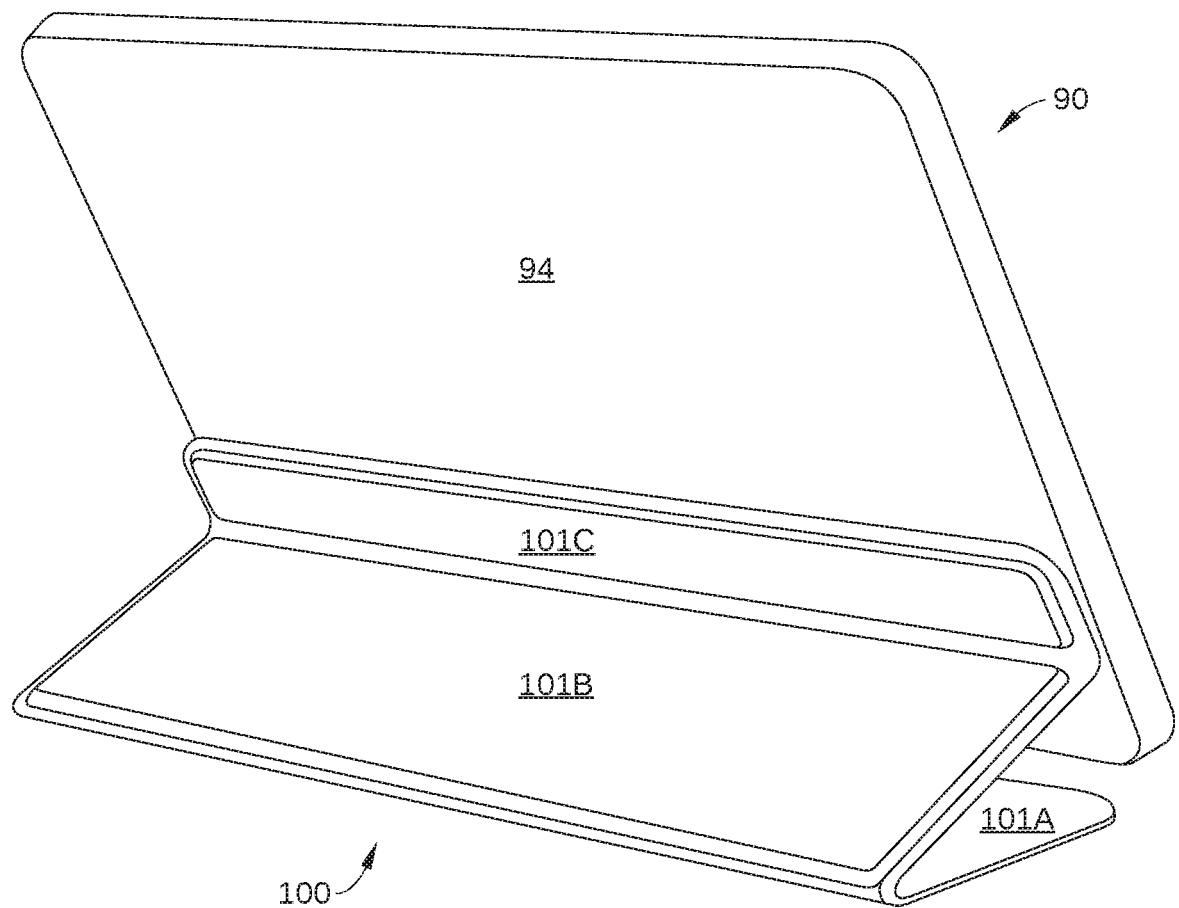
FIG. 3 is a perspective diagram of the cover of FIG. 1 deployed as a stand for a portable computing device, according to various embodiments of the present invention.

In embodiments in which front cover 101 includes multiple hinged panels 101A, 101B, and 101C, cover 100, when hinged appropriately along fold lines 111A, 112A, and 113A, can be employed as a stand to orient portable computing device 90 at a favorable viewing angle, as shown in FIG. 3. FIG. 3 is a perspective diagram of portable computing device 90, in which cover 100 is deployed as a stand for portable computing device 90, according to one or more embodiments of the present invention. As shown, hinged panel 101C can be arranged to support portable computing device 90 in an upright position. In such embodiments, one or more magnets 131 and 132 (shown in FIG. 1) may be disposed in hinged panel 101C to facilitate the support stand configuration illustrated in FIG. 3.

As illustrated in FIG. 1, front cover 101 may include one or more magnets 131 and 132 for holding front cover 101 closed over touchscreen 91 and/or for holding front cover 101 in a particular open or closed position. Specifically, magnets 131 and 132 may be permanent magnets positioned in front cover 101 to respectively align with corresponding coupling components in portable computing device 90, such as coupling components 133, 134, 135, 136, 137, and 138 to hold front cover 101 open or closed. Magnets 131 and 132 can be any suitable magnetic material, and are configured to provide sufficient magnetic retaining force on corresponding coupling components disposed in portable computing device 90 (i.e., coupling components 133-138) to secure front cover 101 in one or more open or closed positions. In some embodiments, coupling components 133-138 may each include a plate of ferro-magnetic material and/or a suitably oriented magnet. In such embodiments, front cover 101 is urged to remain against either a front surface 93 of portable computing device 90 or a rear surface 94 (shown in FIG. 3) of portable computing device 90, in a specific location, by a magnetic attraction force. Thus, front cover 101 can be held in place in a particular position via magnets 131 and 132.

For example, and without limitation, magnets 131 and 132 may be positioned in front cover 101 to align with corresponding coupling components 133 and 134, which are disposed proximate front surface 93. Thus, in some embodiments, when front cover 101 is fully closed, i.e., hinged closed over touchscreen 91, magnet 131 is aligned with coupling component 133 and magnet 132 is aligned with computing device magnet 134, so that front cover 101 is held in place over touchscreen 91. In some embodiments, when front cover 101 is fully opened, i.e., hinged open about flexible hinge region 111, magnet 131 is aligned with coupling component 135 and magnet 132 is aligned with coupling component 136, so that front cover 101 is held in place behind portable computing device 90. In embodiments in which front cover 101 can be deployed as a stand to orient portable computing device 90 at a favorable viewing angle, front cover 101 is configured to hinge about flexible hinge regions 111, 112, and 113, magnet 131 is positioned to align with coupling component 137, and magnet 132 is positioned to align with another coupling component of portable computing device 90 (not shown for clarity). Thus, front cover 101 can be held in place behind portable computing device 90 as a viewing stand, as shown in FIG. 3. Similarly, in some embodiments, magnet 131 is positioned to align with coupling component 138 and magnet 132 is positioned to align with another coupling component of portable computing device 90 (not shown for clarity), so that front cover 101 can be held in place behind portable computing device 90 as a viewing stand at a steeper viewing angle than that shown in FIG. 3. Furthermore, magnets 131 and 132 may be positioned in any other technically feasible location within one or more of hinged panels 101A, 101B, and 101C of front cover 101 to facilitate holding front cover 101 in a particular open or closed position. For example and without limitation, magnets 131 and 132 may be positioned to align with other magnets or coupling components included in front cover 101 to hold front cover 101 in a particular open position.

In some embodiments, magnets 131 and 132 are fully enclosed in SSR sheet 105, and therefore no laminated layers are employed to retain magnets 131 and 132. Consequently, magnets 131 and 132 are securely and permanently positioned in front cover 101, and cannot come free due to an outer lamination layer peeling off of front cover 101, such as a polyurethane, leather, or microfiber layer. In addition, in some embodiments, front cover 101 may include more than or fewer than two magnets 131 and 132. Furthermore, in some embodiments, magnets 131 and/or 132 may include a plate of ferro-magnetic material in addition to or in lieu of a permanent magnet, such as when coupling components 133-138 of portable computing device 90 include magnets of sufficient strength to hold cover 101 in place with no magnets disposed in front cover 101.

Alternatively or additionally, in some embodiments, magnet 131 and/or 132 may be employed as a component of a cover closed indicator mechanism associated with portable computing device 90. In such embodiments, the positioning of magnet 131 proximate coupling component 133 and/or the positioning of magnet 132 proximate coupling component magnet 134 indicates to portable computing device 90 that front cover 101 is closed and touchscreen 91 can therefore be powered off.

In the embodiment illustrated in FIG. 1, cover 100 includes front cover 101 and attachment spine 102, both formed from SSR sheet 105. In other embodiments, cover 100 may further include a back cover that is similar in configuration to front cover 101. In such embodiments, such a back cover may also be formed from the same single SSR sheet 105, so that attachment spine 102 is connected to the back cover via another flexible hinge region that can be substantially similar to flexible hinge region 111 and formed from SSR sheet 105.

As noted above, portable computing device 90 may be any computing device that includes touchscreen 91 and is configurable for use with cover 100, such as a smartphone, a tablet computer, a PDA, and the like. Thus, in embodiments in which portable computing device 90 is a smartphone, cover 100 may not include a front cover, and instead includes one or more stiffener panels that are in a back panel and are fully encapsulated in an SSR sheet. In such embodiments, cover 100 may further include one or more side panels for covering side edges of the smartphone, where the side panels are formed from the same SSR sheet that encapsulates the stiffener panels of the back panel. In some embodiments, such side panels of cover 100 may include one or more stiffener panels that are fully encapsulated in the SSR sheet, and in other embodiments, such side panels may be free of stiffener panels.

Figure 2:
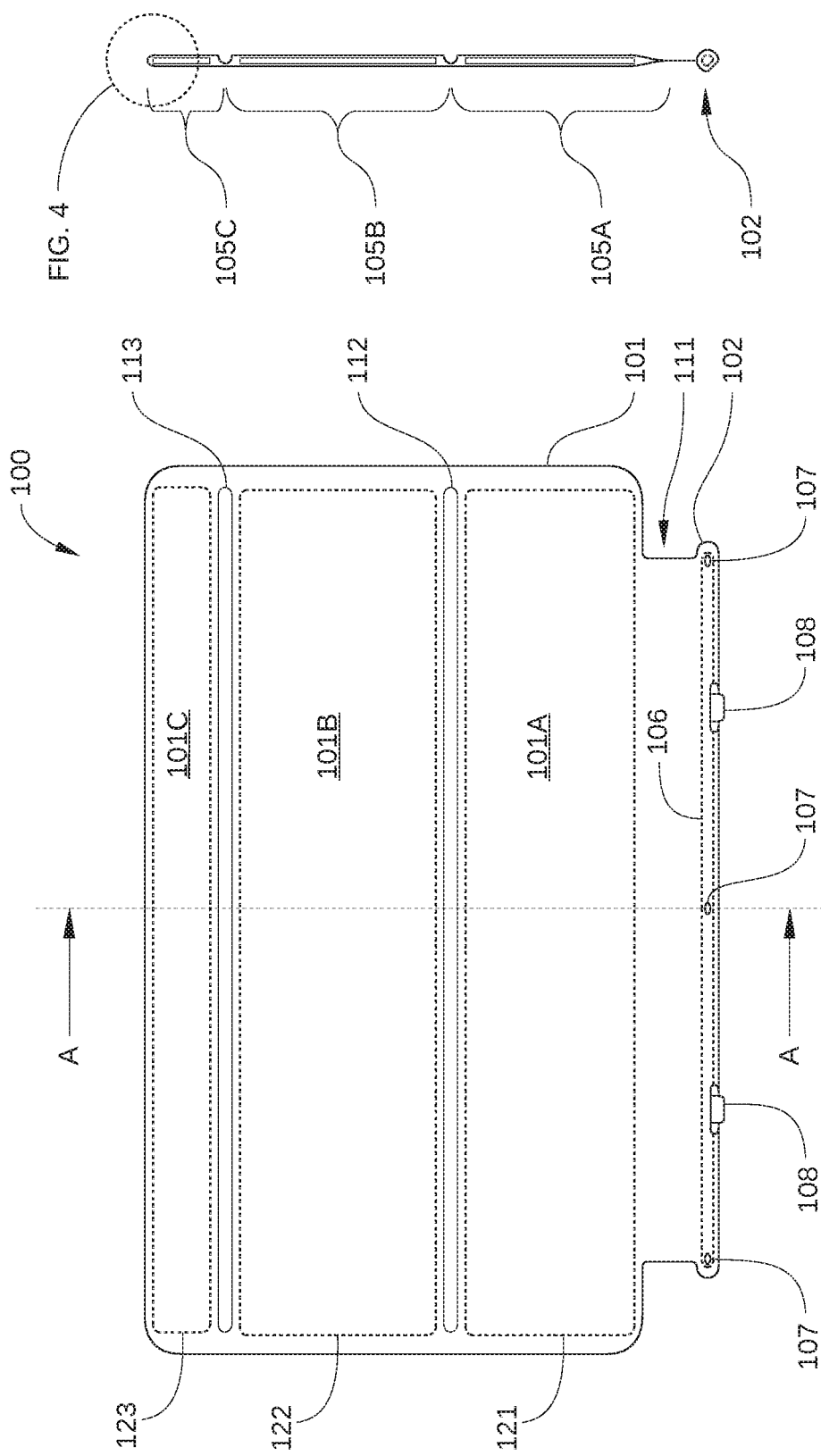
FIG. 2A is a plan view of the cover of FIG. 1, according to various embodiments of the present invention.
FIG. 2B is a cross-sectional view of the cover of FIG. 1, according to various embodiments of the present invention.

Similarly, in embodiments in which portable computing device 90 is a laptop computer or notebook computer, cover 100 may also have an appropriately modified configuration from that illustrated in FIGS. 1-3. For example and without limitation, cover 100 may be configured to protect some or all surfaces of a laptop or notebook computer, such as with a combined front and back cover configuration. In such embodiments, the front cover, attachment spine, and/or back cover of cover 100 may include one or more fully encapsulated stiffener panels. Furthermore, such a one-piece front cover/back cover/attachment spine configuration may also be employed in some embodiments for a tablet computer or other portable computing device 90.

In some embodiments, cover 100 may be fabricated via, for example, a multiple-step injection-molding process. For example, and without limitation, such an injection molding process may include a first step, in which one or more stiffener panels, magnets, and other rigid members, such as stiffener panels 121, 122, and/or 123, magnets 131 and 132, and/or rigid member 106 are positioned in a first tool half. The first tool half is configured with fixtures or other features to accurately hold the rigid members in place and to close off or isolate a first portion of a mold cavity (e.g., a second tool half). Consequently, the first portion of the mold cavity can be filled with a liquid silicone rubber (LSR) material while the rigid members are held in place by the first tool half. In a second step, the first tool half holds the rigid members in place while the second tool half, which forms the first portion of the mold cavity, is filled with LSR material. In a third step, the LSR material that is disposed in the first portion of the mold cavity is partially thermally solidified without being cured, thereby forming a first half of SSR sheet 105. Thus, the rigid members are held in place by the solidified LSR material (now SSR material). In a fourth step, the first tool half is replaced with a third tool half that forms a second portion of the mold cavity. Thus, in the fourth step of the multiple-step injection-molding process, the one or more rigid members and/or stiffener panels can held in position by the first half of SSR sheet 105, which is partially solidified but uncured silicone rubber material formed in the third step. In a fifth step, the third tool half is filled with the LSR material. Thus, the first portion of the mold cavity (i.e., the second tool half) is filled with a first half of SSR sheet 105 that is uncured, but solid SSR material, while the second portion of the mold cavity (i.e., the third tool half) is filled with a second half of SSR sheet 105 that is uncured LSR material. In a sixth step, the SSR material in the first portion of the mold cavity and the LSR material in the second portion of the mold cavity are both thermally cured, to form a single seamless SSR sheet, i.e., SSR sheet 105.

Alternatively, in some embodiments, cover 100 may be fabricated via a compression-molding process. For example, and without limitation, such a compression-molding process may include a first step, in which one or more stiffener panels, magnets, and other rigid members thereon are inserted into a first tool half. Generally, the first tool half has registration features for the one or more rigid members. In a second step of the compression-molding process, a first layer of solid, uncured SSR material is positioned on the rigid members in the mold. In a third step of the compression-molding process, a second tool half is positioned against the first tool half the rigid members and the first layer of solid, uncured SSR material. A low-temperature pressing step is then performed that plastically deforms but does not cure the first layer of solid, uncured SSR material. In a fourth step of the compression-molding process, the first tool half is removed, and the second tool half is flipped over so that the first layer of solid, uncured SSR material and the precisely positioned rigid members are resting on top of the second tool half. A second layer of solid, uncured SSR material is then positioned on the first layer of solid, uncured SSR material and the rigid members. In a fifth step of the compression-molding process, a final high-temperature pressing is performed to thermally cure the first and second layers of solid, uncured SSR material into a single seamless sheet of cured SSR material. It is noted that no portion of any rigid member extends out of the SSR material and no fixture extends into the SSR material to hold the rigid members in place. Thus, the rigid members are free-floating in the SSR material until the material is cured.

Figure 4:
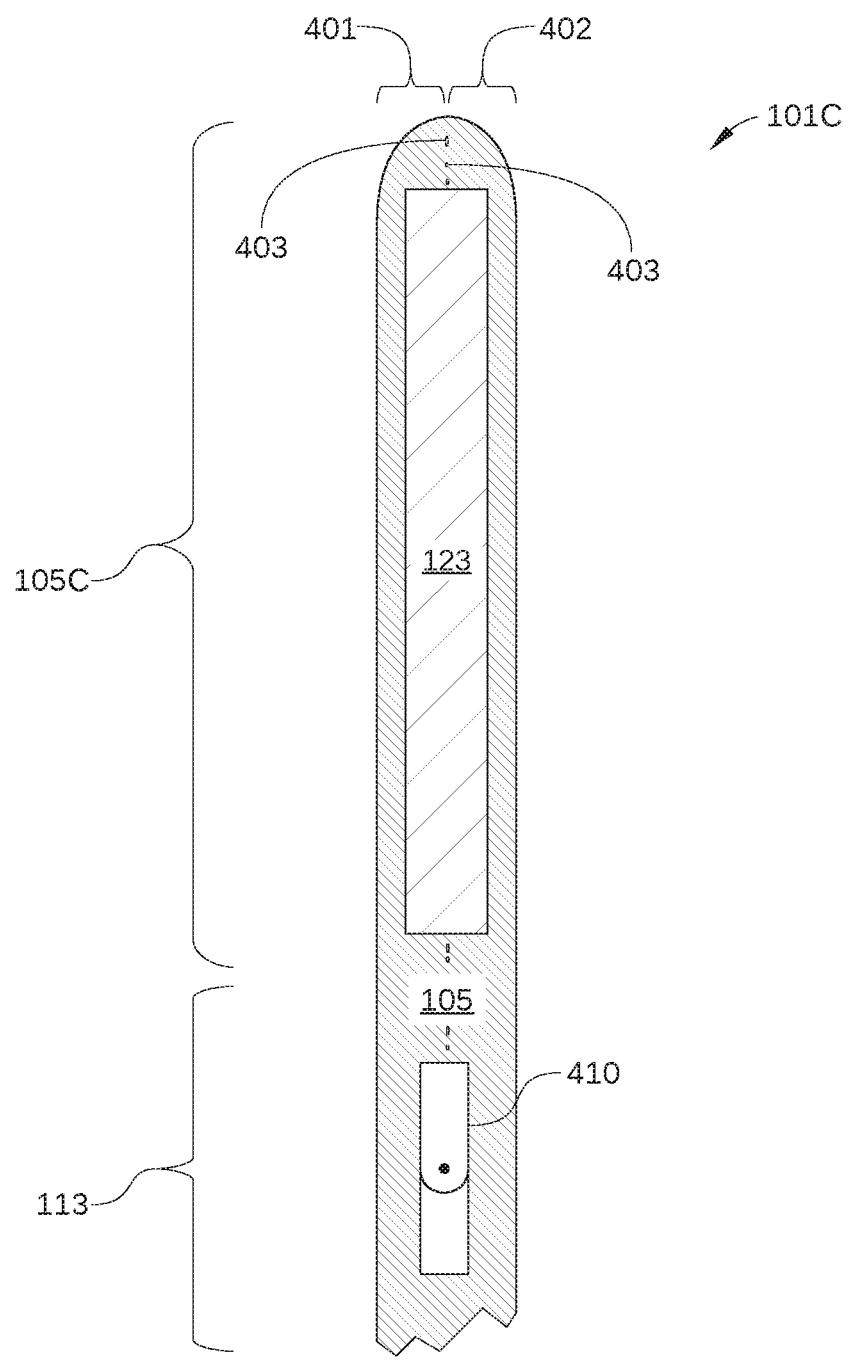
FIG. 4 is a more detailed view of a hinged panel indicated in FIG. 2B, according to various embodiments of the present invention.

In addition to the above-described processes, the scope of the present invention covers any technically feasible techniques for forming cover 100 such that stiffener panels 121-123, magnets 131 and 132, and the like, are fully encapsulated in SSR sheet 105 as shown in FIGS. 1-4. Because the first half and the second half of SSR sheet 105 are cured simultaneously, SSR sheet 105 is formed as a single seamless sheet of SSR material, and the stiffener panels placed therein can be fully encapsulated with SSR material without an exposed surface. One such embodiment of SSR sheet 105 is illustrated in FIG. 4.

FIG. 4 is a more detailed view of hinged panel 101C indicated in FIG. 2B, according to one or more embodiments of the present invention. As shown, stiffener panel 123 is fully encapsulated in a portion 105C of SSR sheet 105 to form hinged panel 101C. That is, stiffener panel 123 is disposed between a first half 401 and a second half 402 of SSR sheet 105, then first half 401 and second half 402 are fully cured. In this way SSR sheet 105 is formed as a single continuous sheet of SSR material, and no surface of stiffener panel 123 is exposed or visible.

It is noted that, in some implementations of SSR sheet 105, the presence of occasional artifacts 403 may be present within SSR sheet 105 that indicate the location of what was previously the boundary between first half 401 and second half 402. Artifacts 403 may include, for example and without limitation, small or microscopic air bubbles trapped between first half 401 and second half 402 during the injection of second half 402 onto first half 401 and stiffener panel 123. Alternatively or additionally, artifacts may include particulate contamination, among other things. However, the presence or absence of artifacts 403 in SSR sheet 105 generally have no impact on the physical integrity of SSR sheet 105, and in no way constitute a seam between two incompletely bonded materials. That is, SSR sheet 105 is a single continuous sheet of SSR material that has been cured at one time, rather than two materials that have been glued, laminated or otherwise connected together.

Also shown in FIG. 4 is a hinge mechanism 410. In some embodiments, a hinge mechanism 410 may be disposed between adjacent stiffener panels in cover 100, or between a stiffener panel and an attachment spine, such as attachment spine 102. Thus, hinge mechanism 410 may be disposed in a flexible hinge region of cover 100, such as flexible hinge region 113. In such embodiments, hinge mechanism 410 may be employed to provide a more rigid hinge region between adjacent hinged panels of cover 100, such as between hinged panels 101A and 101B, hinged panels 101B and 101C, and/or hinged panel 101A and attachment spine 102. In such embodiments, hinge mechanism 410 may be mechanically coupled to one or both of the adjacent stiffener panels or attachment spine. In other embodiments, as shown in FIG. 4, hinge mechanism 410 may be coupled to neither of the adjacent stiffener panels. Similar to stiffener panels 101A-C and rigid member 106, hinge mechanism 410 may be fully encapsulated in SSR panel 105.

Embodiments of the present invention further include any rigid member or component that is fully enclosed in a single seamless layer of SSR material. Thus, embodiments of the invention may be beneficially implemented in a wide variety of structures, for example any structure in a stiffened SSR material would be beneficial, and not simply a cover for a portable computing device.

In sum, embodiments of the present invention provide a cover for a portable computing device that includes one or more stiffener panels fully encapsulated in a solid silicone rubber sheet. Advantageously, the cover is not subject to delamination of material from the stiffener panels or from any portion of the cover, since no components of the cover are laminated to the stiffener panels or to each other. A further advantage is that no surface of the one or more stiffener panels may be exposed. Consequently, the cover can be completely free of holes or penetrations that can be difficult to clean and aesthetically undesirable.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system. Accordingly, aspects of the present disclosure may take the form of an entirely hardware embodiment, or an embodiment combining software and hardware aspects that may all generally be referred to herein as a "circuit," "module" or "system."

While the preceding is directed to embodiments of the present disclosure, other and further embodiments of the disclosure may be devised without departing from the basic scope thereof, and the scope thereof is determined by the claims that follow.

What is claimed is:
1. A cover for a computing device, the cover comprising:
  a cover panel that includes:
    a first portion of a solid silicone rubber sheet, and
    a first stiffener panel that is fully encapsulated in the first portion of the solid silicone rubber sheet,
      wherein the first portion of the solid silicon rubber sheet does not include any seams or perforations resulting from the first stiffener panel being fully encapsulated within the first portion of the solid silicon rubber sheet;

a second cover panel that includes a second stiffener panel that is fully encapsulated in a second portion of the solid silicon rubber sheet a third stiffener panel that is fully encapsulated in a third portion of the solid silicone rubber sheet; and a second flexible hinge region that is disposed between the second stiffener panel and the third stiffener panel and is formed from the solid silicone rubber sheet.

2. The cover of claim 1, wherein the solid silicone rubber sheet comprises a single seamless solid silicon rubber sheet.

3. The cover of claim 1, further comprising a first flexible hinge region that is disposed between the first stiffener panel and the second stiffener panel and is formed from the solid silicone rubber sheet.

4. The cover of claim 3, further comprising a hinge mechanism that is disposed in the first flexible hinge region.

5. The cover of claim 4, wherein the hinge mechanism is fully encapsulated in the solid silicone rubber sheet.

6. The cover of claim 1, further comprising a first magnet that is fully encapsulated in the first portion of the solid silicone rubber sheet and a second magnet that is fully encapsulated in the second portion of the solid silicon rubber sheet, wherein the first magnet is positioned in the first solid silicone rubber sheet to align with the second magnet when the cover panel is folded along a first fold line.

7. The cover of claim 1, further comprising a first magnet that is fully encapsulated in the first portion of the solid silicone rubber sheet and a second magnet that is fully encapsulated in a different portion of the solid silicon rubber sheet, wherein the first magnet is positioned in the first solid silicone rubber sheet to align with the second magnet when the cover panel is folded in the first flexible hinge region.

8. The cover of claim 1, further comprising a first magnet that is fully encapsulated in the first portion of the solid silicone rubber sheet.

9. The cover of claim 8, wherein the first magnet is positioned in the first solid silicone rubber sheet to align with a coupling component disposed in the computing device to hold the cover in one of an open position or a closed position.

10. The cover of claim 9, wherein the coupling component comprises one of a ferro-magnetic material or a permanent magnet.

11. The cover of claim 1, wherein the solid silicone rubber sheet comprises a thermally cured solid silicon rubber material.

12. The cover of claim 1, further comprising a spine member that is fully encapsulated in the first portion of the solid silicone rubber sheet.

13. The cover of claim 12, wherein the spine member is connected to the first panel with a flexible hinge region formed from the solid silicon rubber sheet.

14. A cover for a computing device, the cover comprising:
a cover panel that includes:
a first portion of a solid silicone rubber sheet, and
a first stiffener panel that is fully encapsulated in the first portion of the solid silicone rubber sheet, wherein the first portion of the solid silicon rubber sheet does not include any seams or perforations resulting from the first stiffener panel being fully encapsulated within the first portion of the solid silicon rubber sheet;

a second stiffener panel that is fully encapsulated in a second portion of the solid silicone rubber sheet; and a first magnet that is fully encapsulated in the first portion of the solid silicone rubber sheet and a second magnet that is fully encapsulated in a different portion of the solid silicone rubber sheet;

wherein the first magnet is positioned in the first solid silicone rubber sheet to align with the second magnet when the cover panel is folded in a first flexible hinge region.

15. The cover of claim 14, wherein the solid silicone rubber sheet comprises a single seamless solid silicon rubber sheet.

16. The cover of claim 14, wherein the first flexible hinge region is disposed between the first stiffener panel and the second stiffener panel and is formed from the solid silicone rubber sheet.

17. The cover of claim 14, further comprising a hinge mechanism that is disposed in the first flexible hinge region.

18. The cover of claim 17, wherein the hinge mechanism is fully encapsulated in the solid silicone rubber sheet.

19. The cover of claim 14, further comprising a second cover panel that includes the second stiffener panel that is fully encapsulated in the second portion of the solid silicon rubber sheet.

20. The cover of claim 14, wherein the first magnet is positioned in the first solid silicone rubber sheet to align with the second magnet when the cover panel is folded along a first fold line.

21. The cover of claim 14, further comprising:
a third stiffener panel that is fully encapsulated in a third portion of the solid silicone rubber sheet; and
a second flexible hinge region that is disposed between the second stiffener panel and the third stiffener panel and is formed from the solid silicone rubber sheet.

22. The cover of claim 14, wherein the first magnet is positioned in the first solid silicone rubber sheet to align with a coupling component disposed in the computing device to hold the cover in one of an open position or a closed position.

23. The cover of claim 22, wherein the coupling component comprises one of a ferro-magnetic material or a permanent magnet.

24. The cover of claim 14, wherein the solid silicon rubber sheet comprises a thermally cured solid silicon rubber material.

25. The cover of claim 14, further comprising a spine member that is fully encapsulated in the first portion of the solid silicone rubber sheet.

26. The cover of claim 25, wherein the spine member is connected to the first panel with a flexible hinge region formed from the solid silicon rubber sheet.

* * * * *